United States Patent
Ino (10) Patent No.: US 8,391,425 B2
(45) Date of Patent: Mar. 5, 2013

(54) DATA PROCESSING APPARATUS AND METHOD, RECEIVING APPARATUS AND METHOD, SYNCHRONOUS DETECTION APPARATUS AND METHOD, AND COMPUTER PROGRAM

(75) Inventor: Hiroyuki Ino, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 12/779,253

(22) Filed: May 13, 2010

(65) Prior Publication Data

US 2010/0316171 A1    Dec. 16, 2010

(30) Foreign Application Priority Data

Jun. 16, 2009    (JP) ................................ P2009-142961

(51) Int. Cl.
*H03D 1/00* (2006.01)

(52) U.S. Cl. ........ 375/343; 375/142; 375/150; 375/340; 375/324

(58) Field of Classification Search .................. 375/343, 375/142, 150, 340, 324
See application file for complete search history.

(56) References Cited

U.S. PATENT DOCUMENTS

| 7,688,878 B2* | 3/2010 | Wang et al. ................... 375/130 |
| 2008/0165903 A1* | 7/2008 | Hooli et al. ................... 375/343 |
| 2008/0260014 A1* | 10/2008 | Yang et al. .................... 375/232 |

FOREIGN PATENT DOCUMENTS

| JP | 58-176778 | 10/1983 |
| JP | 2008-72214 | 3/2008 |
| JP | 2008-158855 | 7/2008 |

\* cited by examiner

*Primary Examiner* — Kabir A Timory
(74) *Attorney, Agent, or Firm* — K&L Gates LLP (57) ABSTRACT

A data processing apparatus includes a first correlation operation unit which performs a mutual correlation operation of a first input series and a second input series, a threshold value operation unit which calculates a threshold value based on the first input series, a first comparison unit which compares a first mutual correlation value with the threshold value, a search window setting unit which sets a search window for detecting the second input series to the first input series on the basis of the comparison result, a hard decision unit which performs binarization of the first input series, a second correlation operation unit which performs a mutual correlation operation of a first input hard decision value, and a detection position determining unit which searches for a maximum value of the mutual correlation value within the search window and determines the detection time of the maximum value.

11 Claims, 9 Drawing Sheets

DATA PROCESSING APPARATUS AND METHOD, RECEIVING APPARATUS AND METHOD, SYNCHRONOUS DETECTION APPARATUS AND METHOD, AND COMPUTER PROGRAM

CROSS REFERENCES TO RELATED APPLICATIONS

The present application claims priority to Japanese Priority Patent Application JP 2009-142961 filed in the Japan Patent Office on Jun. 16, 2009, the entire content of which is hereby incorporated by reference.

BACKGROUND

The present application relates to a data processing apparatus and method that perform detection of correlated positions of two data series, a receiving apparatus and method that perform synchronous detection by performing correlation operation of synchronous words composed of known series added to a received packet, a synchronous detection apparatus and method, and a computer program. In particular, the present application relates to a data processing apparatus and method that can perform synchronous detection with a small amount of operation even in a communication environment in which the frequency characteristics are greatly changed or which has a great non-linearity, a receiving apparatus and method, a synchronous detection apparatus and method, and a computer program.

Non-contact communication methods that may be applicable to RFID may be given as an electrostatic coupling type, an electromagnetic induction type, a radio wave communication type, and the like. Also, RFID systems may be classified into three types in accordance with transmission distances: a close coupled type (equal to or less than 0 to 2 mm), a proximity type (equal to or less than 0 to 10 cm), and a vicinity type (equal to or less than 0 to 70 cm), which have been prescribed by International Standards, such as ISO/IEC15693, ISO/IEC14443, ISO/IEC15693, and the like. Among them, as the proximity type IC card standards based on ISO/IEC14443, type A, type B, and FeliCa (registered trademark) may be given.

Further, NFC (Near Field Communication) developed by Sony Corporation and Philips Corporation is mainly an RFID standard which prescribes the specification of an NFC communication device (reader-writer) that is communicable with respective IC cards of the type A and FeliCa, and has become International Standard as ISO/IEC IS 18092 as of December 2003. The NFC communication method has been succeeded from "FeliCa" of Sony Corporation and "Mifare" of Philips Corporation, which have been widely spread as non-contact type IC cards, and uses a band of 13.56 MHz to make the proximity non-contact type bidirectional communication of about 10 cm possible by the electromagnetic induction method (NFC prescribes active type communication of a reader-writer in addition to the communication between a card and a reader-writer).

The primary use of the non-contact communication in the related art is billing or personal authentication, and the communication rate of about 106 Kbps to 424 Kbps is sufficient for the non-contact communication. For this, in order to perform the exchange of large capacity data with the same sense of access time in the related art in consideration of applying to diverse applications such as streaming transmission and the like, a highly accelerated communication rate is necessary. For example, in the FeliCa communication, 424 Kbps, 848 Kbps, 1.7 Mbps, 3.4 Mbps, and the like, which are multiples of 212 Kbps, have been provided, and 212 Kbps and 424 Kbps are mainly used at present. However, it will be considered hereinafter to further increase the communication rate to 848 Kbps, 1.7 Mbps, 3.4 Mbps, and the like.

However, in most communication systems and storage systems, a packet exchange method has been adopted. Its primary purpose is to avoid the occupation of a transmission path by handling the data in a small unit that is called a packet, to efficiently share the communication lines, and to be able to efficiently cope with a path to be replaced when an obstacle occurs in a portion of the communication path.

In packet communication, it is necessary to perform synchronous processing whenever a packet reaches a receiving side. In general, the known series is included in a header section of a packet, and a receiving side can acquire synchronous timing by performing a correlation process of the known series.

Figure 6:
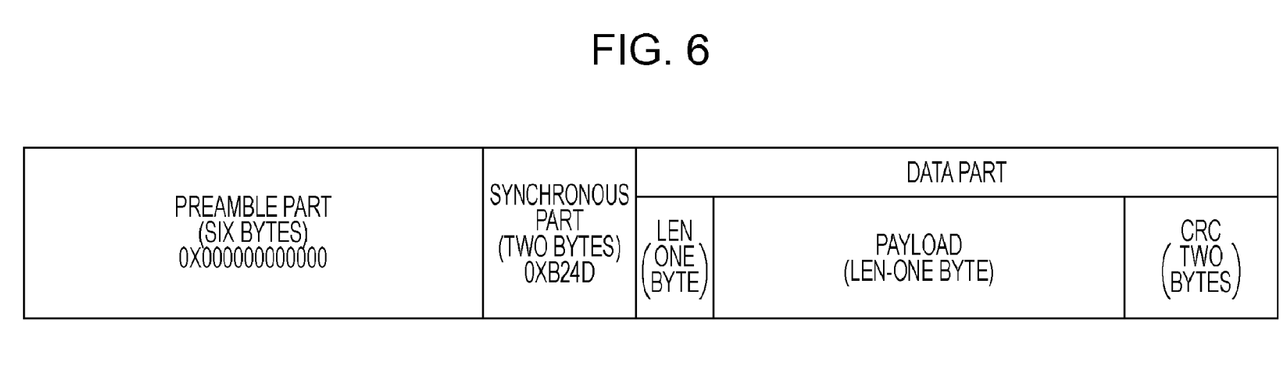
FIG. 6 is a diagram illustrating a physical layer format of a packet determined in the NFC standard.

FIG. 6 illustrates a physical layer format of a packet prescribed in the NFC standard as described above. As illustrated, the packet is composed of three parts: 'a preamble part', a 'synchronous (SYNC) part', and a 'data part'. The preamble part is composed of 6-byte length series of "0", and the sync part is composed of a synchronous word which is composed of two-byte known series of "0xB24D". Also, the data part includes a one-byte LEN that indicates the packet length, a (LEN-1)-byte length data body (i.e. payload), and a two-byte CRC (Cyclic Redundancy Check) code. These parts are all Manchester-encoded. In this case, the same packet format is used in a downlink and an uplink.

On the receiving side, the synchronous processing is very important. According to the format as shown in FIG. 6, the synchronous timing can be detected in the sync part, and it becomes first possible to decode information of the following LEN and payload. That is, if the synchronous processing is not accurately performed, it may not be possible to receive the whole packet.

Figure 7:
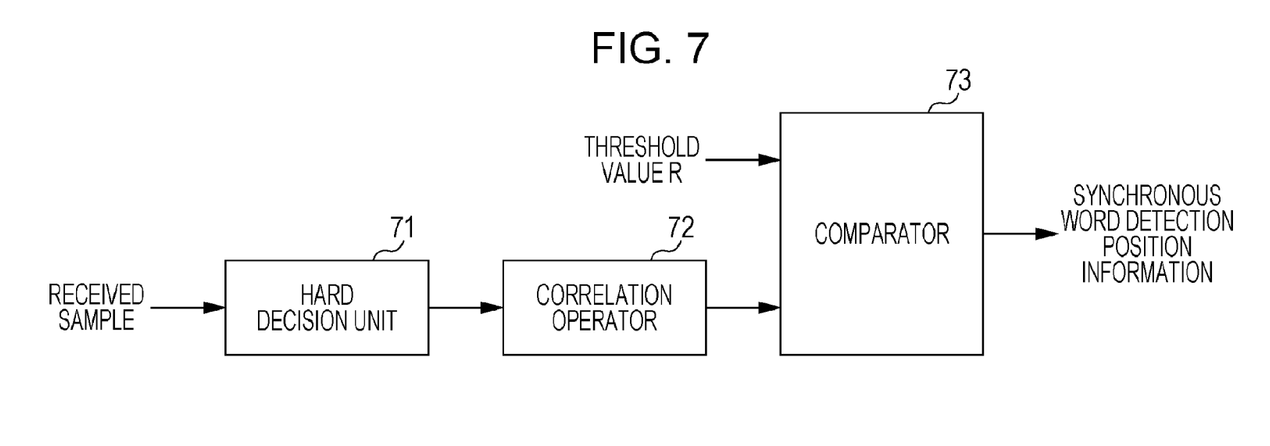
FIG. 7 is a diagram schematically illustrating a functional configuration of synchronous processing.

FIG. 7 schematically illustrates a functional configuration of the synchronous processing. A hard decision unit 71 performs hard decision of a received sample every time n, and outputs a hard decision value of −1 or +1. A correlation operator 72 calculates mutual correlation between a synchronous word series for reference that is composed of N-word length and a hard decision result series composed of N words after the time n. Then, a comparator 73 outputs timing in which the mutual correlation value exceeds a threshold value R within a predetermined search window as detection position information of the synchronous word.

If it is assumed that the synchronous word length is N, synchronous words for reference are $\{a_i\}$, $a_i \in \{-1, +1\}$ (where i is an integer in the range of 0 to N−1), and received samples at time n are $\{y_n\}$, the mutual correlation values calculated by the hard decision of the received samples are expressed as in Equation (1).

$$\hat{X}_n \leftarrow \sum_{i=0}^{N-1} a_i \hat{y}_{n-(N-1)+i} \quad (1)$$

Figure 8:
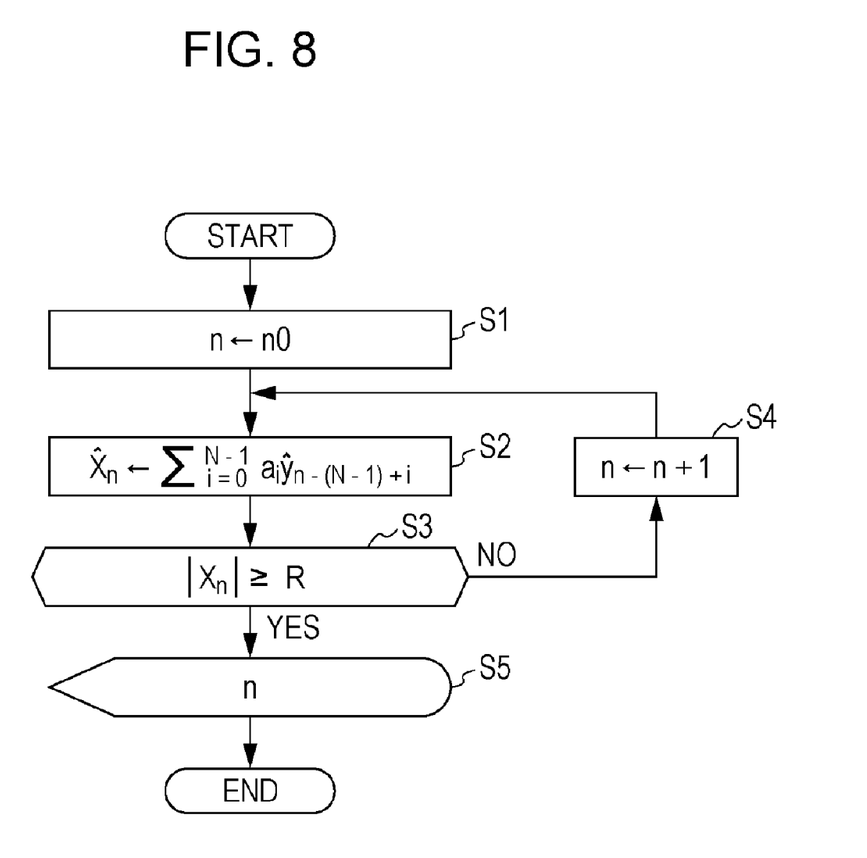
FIG. 8 is a flowchart illustrating a processing order for performing synchronous word detection on the basis of the result of mutual correlation between the synchronous word for the reference of having a length of N and the received word calculated from the hard decision value series of the received sample having a length of N in the same manner.

Where, $\{a_i\}$, $a_i \in \{-1, +1\}$: synchronous words for reference $\{\hat{y}_n\}$, $\hat{y}_n \in$ $\{-1, +1\}$: hard decision values of received samples $y_n$ at time $n$ Also, FIG. 8 shows in the form of a flowchart a processing order for performing synchronous word detection on the basis of the mutual correlation result between the synchronous reference word having a length of N and the received word calculated from the hard decision value series of the received sample having a length of N in the same manner.

First, the detection start time n of the synchronous word is designated as an initial value $n_o$ (step S1). Then, a mutual correlation operation by the hard decision is performed using Equation (1) (step S2), and then it is determined whether the calculated mutual correlation value is equal to or larger than the predetermined threshold value R (step S3).

At this time, in a system which adopts a format that does not manage the positive or negative polarity such as NFC, it is necessary to compare the mutual correlation value with the threshold value as absolute values as in the diagram.

Here, if the mutual correlation value has not yet reached the threshold value R ("No" in step S3), it is determined that no synchronous word exists in the neighborhood of the received sample at time n. In this case, the synchronous word detection start time n is incremented, and then the processing returns to step S2 (step S4) to continue the mutual correlation operation.

On the other hand, if the mutual correlation value exceeds the threshold value R ("Yes" in step S3), it is determined that the synchronous word has come. In this case, the synchronous word detection time n is output (step S5), and then the corresponding processing routine is ended.

In the synchronous processing as shown in FIGS. 7 and 8, the error rate of the hard decision of −1 or +1 of the received word is important. If the error rate of the hard decision value becomes large in the hard decision unit, error necessarily occurs in the mutual correlation operation, and thus the probability of non-detection or erroneous detection of the synchronous word becomes great.

In the case of performing a normalized mutual correlation operation, a correlation operator of FIG. 7 or the mutual correlation operation in step S2 of FIG. 8 may use the following Equation (2) instead of Equation (1)

$$X_n \leftarrow \frac{\sum_{i=0}^{N-1} a_i y_{n-(N-1)+i}}{\sqrt{\sum_{i=0}^{N-1} a_i^2} \cdot \sqrt{\sum_{i=0}^{N-1} y_{n-(N-1)+i}^2}} \quad (2)$$

In the case of considering the device (that is, hardwared configuration) such as the correlation operator or the synchronous detector, the Equation (2) includes a multiplication operation, square root operation, and division, and thus the amount of operation is increased to that extent, that is, they become the main causes of increasing the hardware scale and the power consumption. In particular, since the square root operation and the division are generally realized using a separate dedicated table, it is frequent to generally increase the hardware scale.

In the situation where the error rate of the hard decision value is great, it is necessary to normalize the mutual correlation operation. In a system where the frequency characteristic (specifically phase characteristic) is greatly changed, the error rate of the hard decision value is increased, and thus a normalization mutual correlation operation is necessary. In many wireless communication systems including wireless LANs, the normalization process is adopted in the mutual correlation operation of the synchronous words (for example, refer to Japanese Unexamined Patent Application Publication Nos. 2008-158855, 2008-72214 and 58-176778).

Here, in the NFC communication, the necessity of normalization of the mutual correlation operation during the detection of synchronous words will be considered.

In the NFC communication, for example, a carrier frequency of 13.56 MHz is used, transmission/reception antennas composed of coils are operated as a pair of transformers, and the communication is performed by the magnetic coupling of the coils. The communication distance is about in the range of 0 mm (close coupled) to around a dozen of cm. As a feature of the transformers, it is given that the respective coils are resonant with the carrier frequency at high Q. By amplifying the signal by resonance in the neighborhood of the carrier frequency, the signal can be transmitted farther away. However, in the case of communicating with two resonated coils, the channel characteristic is greatly changed according to the communication distance.

Figure 9A:
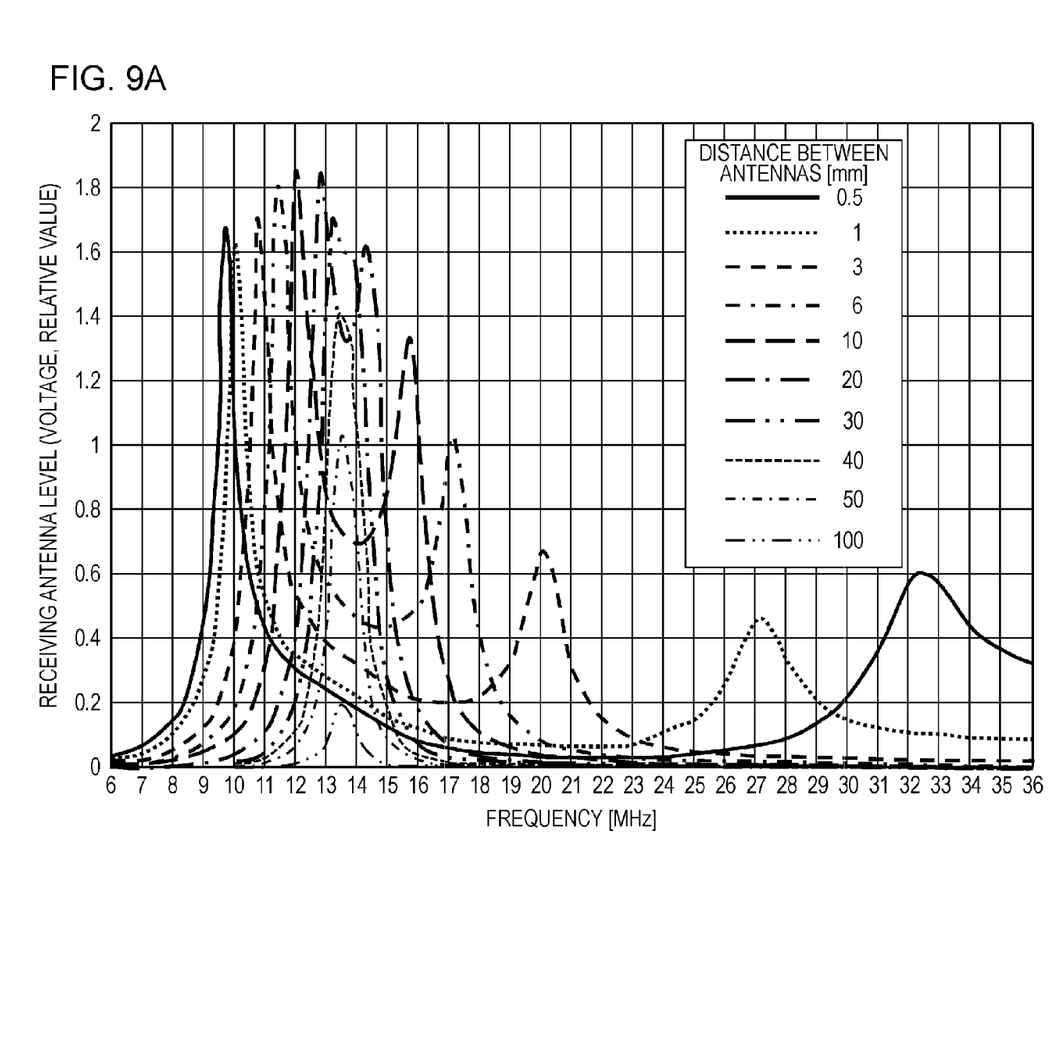
FIG. 9A is a diagram illustrating a frequency characteristic (i.e. amplitude characteristic) of the transmitted signal during data transmission and reception where a distance between antennas composed of coils is in the range of 0.5 mm to 100 mm.
Figure 9B:
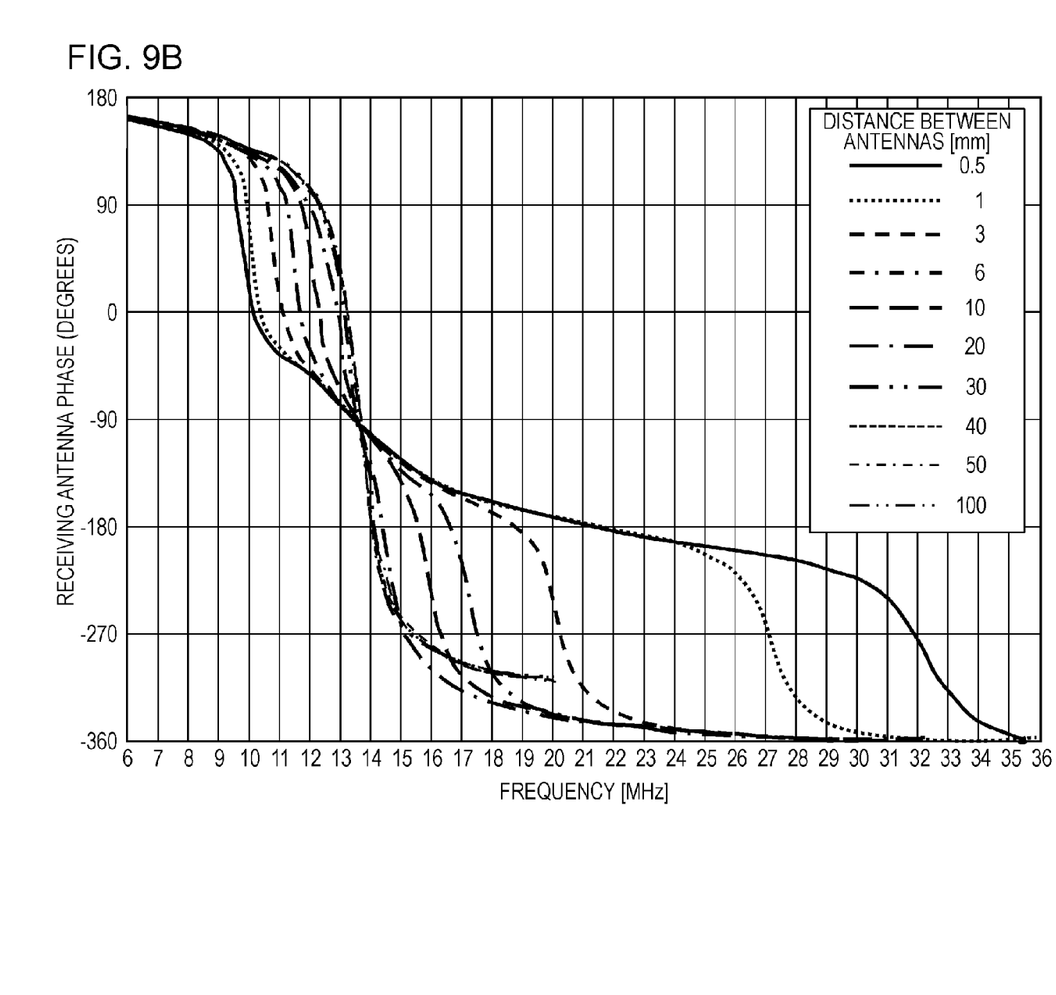
FIG. 9B is a diagram illustrating a frequency characteristic (i.e. phase characteristic) of the transmitted signal during data transmission and reception where a distance between antennas composed of coils is in the range of 0.5 mm to 100 mm.

FIGS. 9A and 9B show frequency characteristics (amplitude characteristic and phase characteristic) of the transmitted signal during data transmission and reception in a state where a distance between antennas composed of coils is in the range of 0.5 mm to 100 mm. For example, in the case where the distance between antennas is 50 mm or 100 mm, one hill having a peak in the neighborhood of the carrier frequency of 13.56 MHz appears. On the other hand, in the case where the distance between the antennas is 20 mm, 6 mm, or 0.5 mm, the resonant hill is separated into two. This is considered to be caused by mutual interference between two close resonant coils. As a result, the carrier frequency of 13.56 MHz becomes a valley between two hills.

In the related art, the change of the channel characteristics according to the communication distance does not specifically become a problem. This is on the basis that the transmission rate being used is not so fast. For example, in the FeliCa and NFC standards, the Manchester code having the transmission rate of 212 kbps is adopted, and the frequency of the maximum repetition wave is 212 kHz (i.e. the transmission band is ±212 kHz). Referring to FIG. 9A, if the communication distance is far away, the receiving antenna level deteriorates by about ½ with respect to the carrier frequency of ±212 kHz. However, in most communication distances, a nearly even frequency characteristic is in the transmission band. Due to this, it is considered that the received signal is not greatly distorted by the frequency characteristic of the channel, and the error rate is suppressed to be low even though the hard decision of {−1, +1} is performed with respect to the received signal.

However, if the transmission rate is heightened even in the NFC communication (as described above), the baseband signal spectrum is widened as much as the heightened rate, and thus the frequency as wide as the heightened rate is necessary during detecting of the received signal. Accordingly, the influence of the frequency characteristic of the channel is increased, the result being to heighten the error rate of the hard decision value of the received words, and this causes the increase of the probability of non-detection or erroneous detection of the synchronous words.

In summary, according to an existing relatively low-speed NFC communication in the related art, since the frequency characteristic in the transmission band is generally even, the error rate of the hard decision value of the received word is decreased, and thus it is not necessary to perform normalization of the correlation operation. In contrast, in the case of the speeding up communication, since the frequency characteristic in the transmission band is not even, the error rate of the hard decision value of the received word is increased, and thus the probability of non-detection or erroneous detection of the synchronous word is also increased.

In a system where the frequency characteristic (particularly, the phase characteristic) is greatly changed, even though the normalization of the mutual correlation has been performed as shown in Equation (2), it is difficult to determine an appropriate threshold value R in all communicable range. That is because it is difficult to estimate the influence that phase shift exerts upon the correlation value in all communication distances.

SUMMARY

The present application provides a superior data processing apparatus and method, a receiving apparatus and method, a synchronous detection apparatus and method, and a computer program, which can accurately perform synchronous detection by performing a correlation operation of synchronous words composed of known series added to a received packet according to an embodiment.

The present application also provides a superior data processing apparatus and method, a receiving apparatus and method, a synchronous detection apparatus and method, and a computer program, which can perform synchronous detection more accurately with a small amount of operation even in a communication environment in which the frequency characteristic is greatly changed or which has a great non-linearity.

According to an embodiment, there is provided a data processing apparatus including: a first correlation operation unit which performs a mutual correlation operation of a first input series and a second input series that are composed of discrete samples; a threshold value operation unit which calculates a threshold value based on the first input series; a first comparison unit which compares a first mutual correlation value calculated by the first correlation operation unit with the threshold value calculated by the threshold value operation unit; a search window setting unit which sets a search window for detecting the second input series to the first input series on the basis of the comparison result calculated by the first comparison unit; a hard decision unit which performs binarization of the first input series; a second correlation operation unit which performs a mutual correlation operation of a first input hard decision value calculated by binarization of the first input series and the second input series; and a detection position determining unit which searches for a maximum value of the mutual correlation value calculated by the second correlation operation unit within the search window, and determines the detection time of the maximum value as the detection position of the second input series.

In the data processing apparatus according to an embodiment, the first correlation operation unit performs a denormalization mutual correlation operation of the first input series and the second input series composed of soft decision values of the discrete samples of the input signal.

In the data processing apparatus according to an embodiment, the threshold value operation unit calculates the threshold value based on the total sum of amplitude absolute values of the first input series.

In the data processing apparatus according to an embodiment, the second correlation operation unit performs denormalization mutual correlation of the first input hard decision value and the second input series.

In the data processing apparatus according to an embodiment, the second input series is treated as a reference word that is composed of elements of two known values.

According to another embodiment, there is provided a data processing method including: a first correlation operation step of performing a mutual correlation operation of a first input series and a second input series that are composed of discrete samples; a threshold value operation step of calculating a threshold value based on the first input series; a first comparison step of comparing a first mutual correlation value calculated in the first correlation operation step with the threshold value calculated in the threshold value operation step; a search window setting step of setting a search window for detecting the second input series to the first input series on the basis of the comparison result calculated in the first comparison step; a hard decision step of performing binarization of the first input series; a second correlation operation step of performing a mutual correlation operation of a first input hard decision value calculated by binarization of the first input series and the second input series; and a detection position determining step of searching for a maximum value of the mutual correlation value calculated in the second correlation operation step within the search window, and determining the detection time of the maximum value as the detection position of the second input series.

According to still another embodiment, there is provided a receiving apparatus including: a receiving unit which receives transmitted data; an AD conversion unit which quantizes a received analog signal by sampling the analog received signal; a first correlation operation unit which performs a mutual correlation operation of a received series composed of discrete samples after the AD conversion and a synchronous word composed of a known series; a threshold value operation unit which calculates a threshold value based on the received series; a first comparison unit which compares a first mutual correlation value calculated by the first correlation operation unit with the threshold value calculated by the threshold value operation unit; a search window setting unit which sets a search window for detecting the synchronous words to the received series on the basis of the comparison result calculated by the first comparison unit; a hard decision unit which performs binarization of the received series; a second correlation operation unit which performs a mutual correlation operation of a first received hard decision value calculated by binarization of the received series and the synchronous word; and a detection position determining unit which searches for a maximum value of the mutual correlation value calculated by the second correlation operation unit within the search window, and determines the detection time of the maximum value as the detection position of the synchronous word.

According to still another embodiment, there is provided a receiving method including: a receiving step of receiving transmitted data; an AD conversion step of quantizing a received analog signal by sampling the analog signal; a first correlation operation step of performing a mutual correlation operation of a received series composed of discrete samples after the AD conversion and a synchronous word composed of a known series; a threshold value operation step of calculating a threshold value based on the received series; a first comparison step of comparing a first mutual correlation value calculated in the first correlation operation step with the threshold value calculated in the threshold value operation step; a search window setting step of setting a search window for detecting the second input series to the first input series on the basis of the comparison result calculated in the first comparison step; a hard decision step of performing binarization of the received series; a second correlation operation step of performing a mutual correlation operation of a first received hard decision value calculated by binarization of the received series and the synchronous word; and a detection position determining step of searching for a maximum value of the mutual correlation value calculated in the second correlation operation step within the search window, and determining the detection time of the maximum value as the detection position of the synchronous word.

According to still another embodiment, there is provided a synchronous detection apparatus including: a first correlation operation unit which performs a mutual correlation operation of a received series composed of discrete samples and a synchronous word composed of a known series; a threshold value operation unit which calculates a threshold value based on the received series; a first comparison unit which compares a first mutual correlation value calculated by the first correlation operation unit with the threshold value calculated by the threshold value operation unit; a search window setting unit which sets a search window for detecting the synchronous words to the received series on the basis of the comparison result calculated by the first comparison unit; a hard decision unit which performs binarization of the received series; a second correlation operation unit which performs a mutual correlation operation of a first received hard decision value calculated by binarization of the received series and the synchronous word; and a detection position determining unit which searches for a maximum value of the mutual correlation value calculated by the second correlation operation unit within the search window, and determines the detection time of the maximum value as the detection position of the synchronous word.

According to still another embodiment, there is provided a synchronous detection method including: a first correlation operation step of performing a mutual correlation operation of a received series composed of discrete samples and a synchronous word composed of a known series; a threshold value operation step of calculating a threshold value based on the received series; a first comparison step of comparing a first mutual correlation value calculated in the first correlation operation step with the threshold value calculated in the threshold value operation step; a search window setting step of setting a search window for detecting the synchronous words to the received series on the basis of the comparison result calculated in the first comparison step; a hard decision step of performing binarization of the received series; a second correlation operation step of performing mutual correlation operation of a first received hard decision value calculated by binarization of the received series and the synchronous word; and a detection position determining step of searching for a maximum value of the mutual correlation value calculated in the second correlation operation step within the search window, and determining the detection time of the maximum value as the detection position of the synchronous word.

According to still another embodiment, there is provided a computer program described in a computer readable manner to execute on a computer a process for performing detection of a correlation position of two data series, the computer program prompting a computer to function as: a first correlation operation unit which performs a mutual correlation operation of a first input series and a second input series that are composed of discrete samples; a threshold value operation unit which calculates a threshold value based on the first input series; a first comparison unit which compares a first mutual correlation value calculated by the first correlation operation unit with the threshold value calculated by the threshold value operation unit; a search window setting unit which sets a search window for detecting the second input series to the first input series on the basis of the comparison result calculated by the first comparison unit; a hard decision unit which performs binarization of the first input series; a second correlation operation unit which performs a mutual correlation operation of a first input hard decision value calculated by binarization of the first input series and the second input series; and a detection position determining unit which searches for a maximum value of the mutual correlation value calculated by the second correlation operation unit within the search window, and determines the detection time of the maximum value as the detection position of the second input series.

The computer program according to still another embodiment defines a computer program described in a computer readable manner to execute on a computer a predetermined process. In other words, by installing the computer program according to the embodiment in the computer, a cooperative operation is performed on the computer, and thus the same working effect as that of the data processing apparatus as described above can be calculated.

According to an embodiment, a superior data processing apparatus and method, a receiving apparatus and method, a synchronous detection apparatus and method, and a computer program can be provided, which can accurately perform synchronous detection by performing correlation operation of synchronous words composed of known series added to a received packet.

Also, according to an embodiment, a superior data processing apparatus and method, a receiving apparatus and method, a synchronous detection apparatus and method, and a computer program can be provided, which can perform synchronous detection more accurately with a small amount of operation even in a communication environment in which the frequency characteristic is greatly changed or which has a great non-linearity.

According to an embodiment, denormalization mutual correlation values are calculated from the received soft decision values, a mutual correlation maximum value search window is determined on the basis of the size comparison of the calculated mutual correlation values with the threshold value, the denormalization mutual correlation value is calculated from the received soft decision value, and the calculated value can be determined as the synchronous word detection position in which the corresponding mutual correlation value becomes at maximum in the search window. Accordingly, for example, even in the communication environment in which the frequency characteristic is greatly changed or which has a great non-linearity, the synchronous detection can be performed more accurately with a small amount of operation, and further it is possible to perform an accurate data reception with a small amount of operation.

Additional features and advantages are described herein, and will be apparent from the following Detailed Description and the figures.

DETAILED DESCRIPTION

The present application will be described in detail with reference to the accompanying drawings according to an embodiment.

Figure 1:
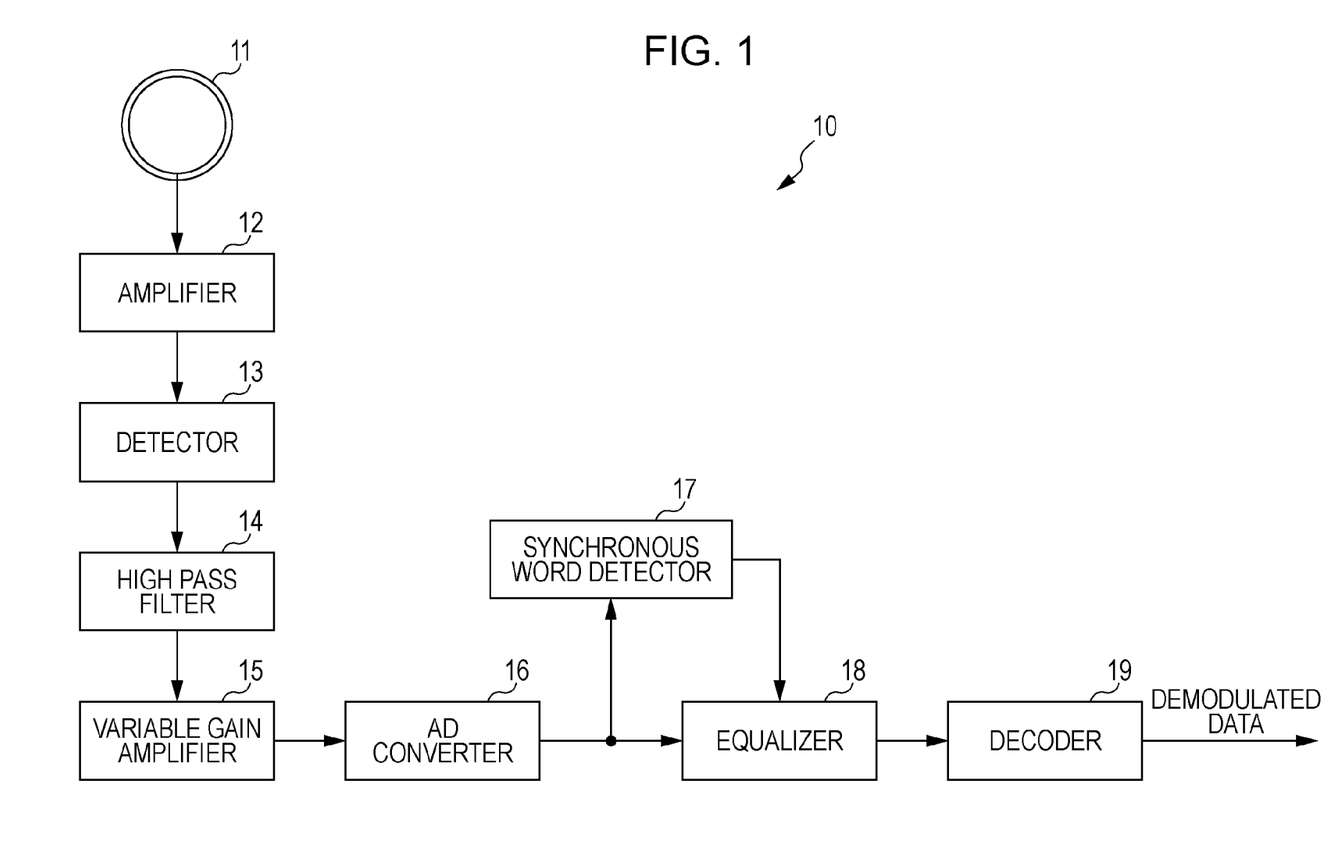
FIG. 1 is a diagram schematically illustrating a hardware configuration example of a receiving apparatus 10 to which the present application is applicable.

FIG. 1 is a diagram schematically illustrating a hardware configuration example of a receiving apparatus 10 to which the present application is applicable. As illustrated, a receiving apparatus 10 may be applied to, for example, an NFC communication system, and performs reception processing of a packet based on the format as shown in FIG. 6.

An antenna 11 is composed of, for example, coils wound and installed to resonate at high Q. A signal received in the antenna 11 is low-noise-amplified by an amplifier 12, detection and demodulation of the signal is performed by a detector 13, and unnecessary low frequency component is removed by a high pass filter 14.

A variable gain amplifier 15 performs gain adjustment of the amplitude of the received signal so that the received signals are gathered in a dynamic range of the following AD converter 16. Then, the AD converter 16 quantizes the received signal with appropriately adjusted amplitude by sampling the received signal. The output of the AD converter 16 corresponds to the received soft decision value which has not been hard-decided as −1 or +1. Here, it is necessary that the input signal of the AD converter 16 satisfies the sampling theorem, and as necessary, a low pass filter (not illustrated) is arranged on the previous paragraph of the AD converter 16.

The synchronous word detector 17 detects timing of the synchronous word (i.e. SYNC part) added to the header section of the received packet by performing a mutual correlation operation of the received soft decision value output from the AD converter 16.

In the embodiment, the synchronous word detector 17 calculates the denormalization mutual correlation value from the received soft decision value, determines the search window of the mutual correlation maximum value on the basis of the size comparison of the calculated mutual correlation value with the threshold value, then calculates the denormalization mutual correlation value from the received hard decision value, and determines the calculated value as the synchronous word detection position in which the applicable corresponding mutual correlation value becomes maximum within the search window. However, the details of the synchronous word detection process will be described later.

An equalizer 18 performs correction of the change of the frequency characteristic occurring on the transmission path, i.e. the frequency offset included in the received signal. As shown in FIG. 9A, in a system where the frequency characteristic is greatly changed, it should be understood that the equalization process of the received signal is important.

For example, a Manchester code is applied in the NFC communication. A decoder 19 performs the decoding of the Manchester code.

Figure 2:
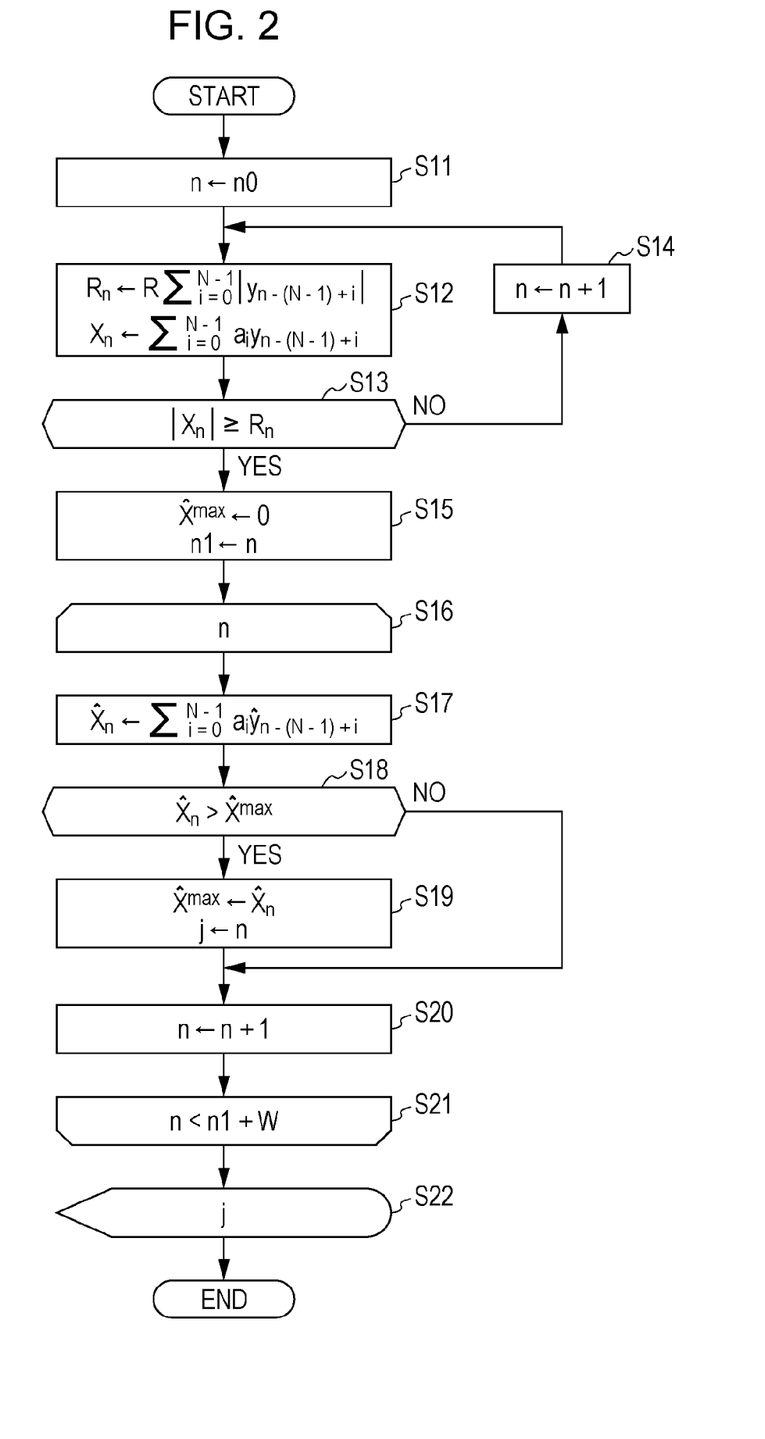
FIG. 2 is a flowchart illustrating a processing order for detecting synchronous words by mutual correlation in a synchronous word detector 17.

FIG. 2 shows the processing order for detecting synchronous words by mutual correlation in the synchronous word detector 17 in the form of a flowchart.

First, a detection start time n of the synchronous word is designated as an initial value no (step S11). Then, as the first step of detecting the synchronous word, the denormalization mutual correlation value is calculated from the received soft decision value, and the synchronous word detection start time is determined on the basis of the size comparison of the calculated mutual correlation value with the threshold value.

In the first step, specifically, according to Equation (4) below, the denormalization mutual correlation operation of the soft decision value series of the received samples corresponding to the amount of the past N words from the time n and the synchronous word series having the length of N words is performed. Also, according to Equation (3) below, the total sum of amplitude absolute values of the received sample series (i.e. received soft decision values) corresponding to the amount of the past N words from the time n is acquired, and the threshold value Rn at the detection time n is calculated by multiplying the total sum by the threshold value coefficient R (where, $0 \leq R \leq 1$) (step S12).

N is a word length of the synchronous word (i.e. SYNC part) (which is the same as that described above).

$$R_n \leftarrow R \sum_{i=0}^{N-1} |y_{n-(N-1)+i}| \qquad (3)$$

$$X_n \leftarrow \sum_{i=0}^{N-1} a_i y_{n-(N-1)+i} \qquad (4)$$

The threshold value coefficient R that is used to calculate the threshold value $R_n$ is an important integer that controls the performance of the synchronous word detection. It is to be noted that if R is set to be larger than that is necessary, the probability of non-detection of the synchronous word is increased, whereas if R is set to be smaller than that is necessary, the probability of erroneous detection of the synchronous word is increased. In the case where the threshold value coefficient R is set to "1" and elements of the synchronous word $\{a_i\}$ correspond to two values of −1 and +1, the maximum value of the absolute value of the denormalization mutual correlation value $X_n$ at the detection time n becomes equal to the threshold value $R_n$.

Then, it is determined whether the calculated denormalization mutual correlation value becomes larger than the threshold value $R_n$ (step S13).

In the system that adopts the format that does not manage the positive or negative polarity such as NFC, it is necessary to compare the mutual correlation value with the threshold value as absolute values in step S13. For example, in the case where only the positive polarity synchronous word is detected, it is not necessary to obtain the absolute value of the denormalization mutual correlation value $X_n$ by the received soft decision value. Also, in the case of detecting only the negative polarity synchronous word, the denormalization mutual correlation value may become $-X_n$.

Also, in an illustrated example, if the denormalization mutual correlation value $X_n$ becomes equal to the threshold value $R_n$, the determination result in step S13 becomes true, but it is not a great problem even if the result of determination becomes false. However, in the former and the latter, there is a possibility that the optimum set value of the threshold value coefficient R differs.

Here, if the mutual correlation value has not yet reached the threshold value $R_n$ ("No" in step S13), it is determined that no synchronous word exists in the neighborhood of the received sample at time n. In this case, the synchronous word detection start time n is incremented, and then the processing returns to step S12 (step S14) to continue the denormalization mutual correlation operation.

On the other hand, if the denormalization mutual correlation value exceeds the threshold value $R_n$ ("Yes" in step S13), it is determined that the time when the synchronous word comes is near. In this case, as the following second step, the detection process in the synchronous word detection position starts from the synchronous word detection start time.

In the second step, first, it is determined that the maximum value of the denormalization mutual correlation value that is calculated from the received hard decision value is set to the initial value of "0", and the synchronous word detection start time n determined in the first step is set as the initial value of the synchronous word detection position n1 (step S15).

Then, in a loop process composed of steps S16 to S21, the synchronous word detection position in which the mutual correlation value of the received hard decision value in the search window and the synchronous reference word becomes peak is searched for. Specifically, according to Equation (1) as described above, the denormalization mutual correlation operation of the received hard decision values corresponding to the amount of the past N words from the time n and the synchronous word series {ai} having the length of N words is performed (step S17), and the calculated denormalization mutual correlation value is compared in size with the maximum value up to now (step S18). If the calculated value exceeds the maximum value, the maximum value is appropriately updated, and the detection time n is preserved in a variable j as a candidate of the synchronous word detection position (step S19). In this way, the denormalization mutual correlation operation and the update process of the maximum value and the synchronous word detection position are repeatedly performed as many as the number of times that corresponds to the search window W in consideration of the time n1 as the detection start time (steps S20 and S21).

Referring to Equation (1) as described above, in the case that the elements of the synchronous word $\{a_i\}$ correspond to two values of −1 and +1, the amount of operational processing becomes greatly small since the denormalization mutual correlation operation by the received hard decision value is composed of multiplication and summation operation of bits.

Also, when the loop process is ended, the synchronous word detection time j when the maximum value of the mutual correlation value is detected is output as the synchronous word detection position (step S22), and the corresponding processing routine is ended.

As described above, the denormalization mutual correlation values are calculated from the received soft decision values, the mutual correlation maximum value search window is determined on the basis of the size comparison of the calculated mutual correlation values with the threshold value, the denormalization mutual correlation value is calculated from the received hard decision value, and the calculated value is determined as the synchronous word detection position in which the applicable corresponding mutual correlation value becomes maximum in the search window. Accordingly, for example, even in the communication environment in which the frequency characteristic is greatly changed or which has a great non-linearity, the synchronous detection can be performed more accurately with a small amount of operation, and further it is possible for accurate data reception with a small amount of operation.

Figure 3:
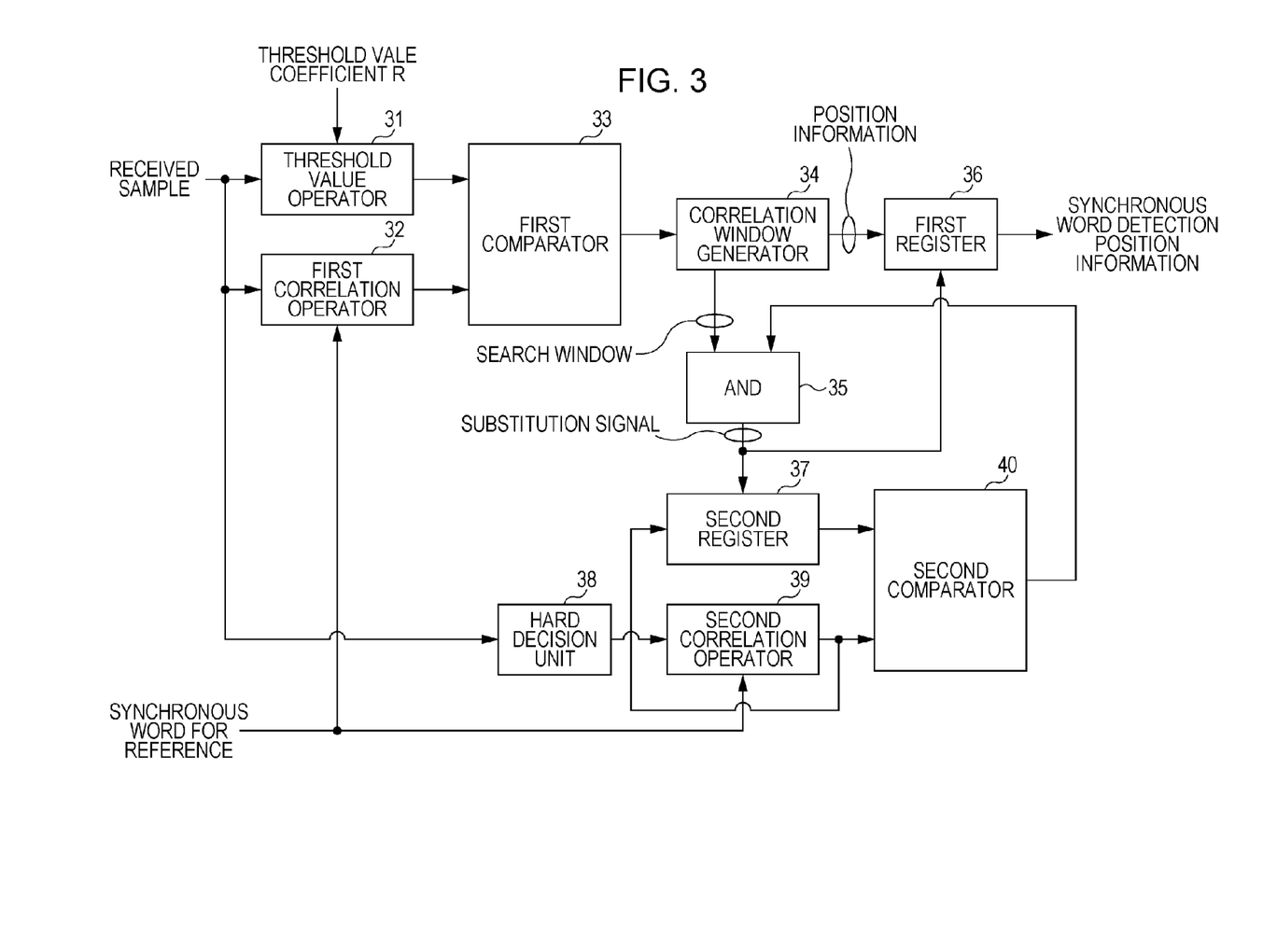
FIG. 3 is a functional block diagram of the inside of a synchronous word detector 17 for detecting synchronous words according to the processing order as indicated in FIG. 2.

FIG. 3 is a functional block diagram of the inside of a synchronous word detector 17 for detecting synchronous words according to the processing order as indicated in FIG. 2.

A threshold value operator 31, a first correlation operator 32, and a first comparator 33 are function modules that perform the corresponding processes in the first step.

The threshold value operator 31 corresponds to step S12, and according to Equation (3) as described above, the total sum of the amplitude absolute value of the series of the soft decision values of the received samples corresponding to the amount of the past N words from the time n is acquired, and the threshold value Rn at the detection time n is calculated by multiplying the total sum by the input threshold value coefficient R.

Also, the first correlation operator 32 corresponds to step S12, and according to Equation (4) as described above, the denormalization mutual correlation operation of the soft decision value series $\{y_n\}$ of the received samples corresponding to the amount of the past N words from the time n and the synchronous word series $\{a_i\}$ having the length of N words is performed.

The first comparator 33 corresponds to step S13, and compares in size the absolute value of the result of the denormalization mutual correlation operation calculated by the first correlation operator 32 with the threshold value $R_n$ at the detection time n calculated by the threshold value operation unit 31. Also, the time n when the denormalization mutual correlation value is equal to or larger than the threshold value $R_n$, becomes the synchronous word detection start time, i.e. the trigger for determining the search window, and the comparison result is output to the following search window generator 34.

The search window generator 34, a logical product operation unit (AND) 33, a first register 36, a second register 37, a hard decision unit 38, a second correlation operator 39, and a second comparator 40 are function modules which perform the processing that corresponds to the second step.

The search window generator 34 corresponds to step S15, and at the time n when it is determined by the first comparator 33 that the denormalization mutual correlation value is equal to or larger than the threshold value $R_n$, the search window generator 34 sets a counter that corresponds to the width W of the search window. Also, at the corresponding time, the synchronous word detection start time n determined in the first step is stored in the first register 36 as the initial value of the synchronous word detection position n1, and the initial value of "0" is stored in the second register 37 as the maximum value of the denormalization mutual correlation value calculated from the received hard decision value.

The hard decision unit 38 performs the binarization of the received sample by performing sequential hard decision of the received sample with one of −1 and +1 every time.

The second correlation operator 39 corresponds to step S17, and performs the denormalization mutual correlation operation of the received hard decision values corresponding to the amount of the past N words from the time n, which is output from the hard decision unit 38, and the synchronous word series {$a_i$} having the length of N words input from the outside, according to Equation (1) as described above.

The second comparator 40 corresponds to step S18, and compares in size the result of the denormalization mutual correlation operation calculated by the second correlation operator 39 at time n with the maximum value of the denormalization mutual correlation value up to now, which is stored in the second register 37, to output the result of comparison to the logical product operation unit 35.

The search window generator 34 continuously outputs a logic value of "1" while the time n is within the search window (i.e. a period when n<n1+W is effected), and output a logic value of "0" after the time n elapses the search window (i.e. n≧n1+W). On the other hand, the second comparator 40 outputs a logic value of "1" when the denormalization mutual correlation value newly calculated at time n exceeds the maximum value. Accordingly, when a new maximum value of the denormalization mutual correlation value is detected in the search window, the logical product operation unit 35 outputs a logic value of "1". Also, the second register 37 replaces the stored maximum value with the denormalization mutual correlation value newly calculated at time n through triggering of the logic value output as the process corresponding to the step S19. Also, the first register 36 replaces the synchronous word detection position n1 with the current time n through triggering of the logic value output.

After the denormalization mutual correlation operation is repeatedly performed as many as the number of times that corresponds to the search window W at time n1 that is the detection start time, the synchronous word detection position j is stored in the first register 36. After the mutual correlation maximum value search window is determined on the basis of the size comparison of the denormalization mutual correlation value calculated from the received soft decision value with the threshold value, the denormalization mutual correlation value is calculated from the received hard decision value, and is determined as the synchronous word detection position in which the corresponding mutual correlation value becomes at maximum within the search window. Accordingly, the synchronous word detection position j becomes more accurate. For example, as illustrated in FIG. 6, the synchronous word of the sync part of the packet or format can be accurately detected, and thus it is possible to decode information such as the following LEN and payload.

In the embodiment as illustrated in FIGS. 2 and 3, the total sum of the amplitude absolute values of the received soft decision values is acquired, and the threshold value Rn that evaluates the denormalization mutual correlation value by the received soft decision value is multiplied by the reference level R to further consider the variation of the received signal level (i.e. amplitude). Accordingly, even in the modified example in which the synchronous word detection position is searched for only in the first step, the synchronous word can be accurately detected in comparison to the method of performing the synchronous word detection from the denormalization mutual correlation value by the received hard decision value (see FIGS. 7 and 8).

Figure 4:
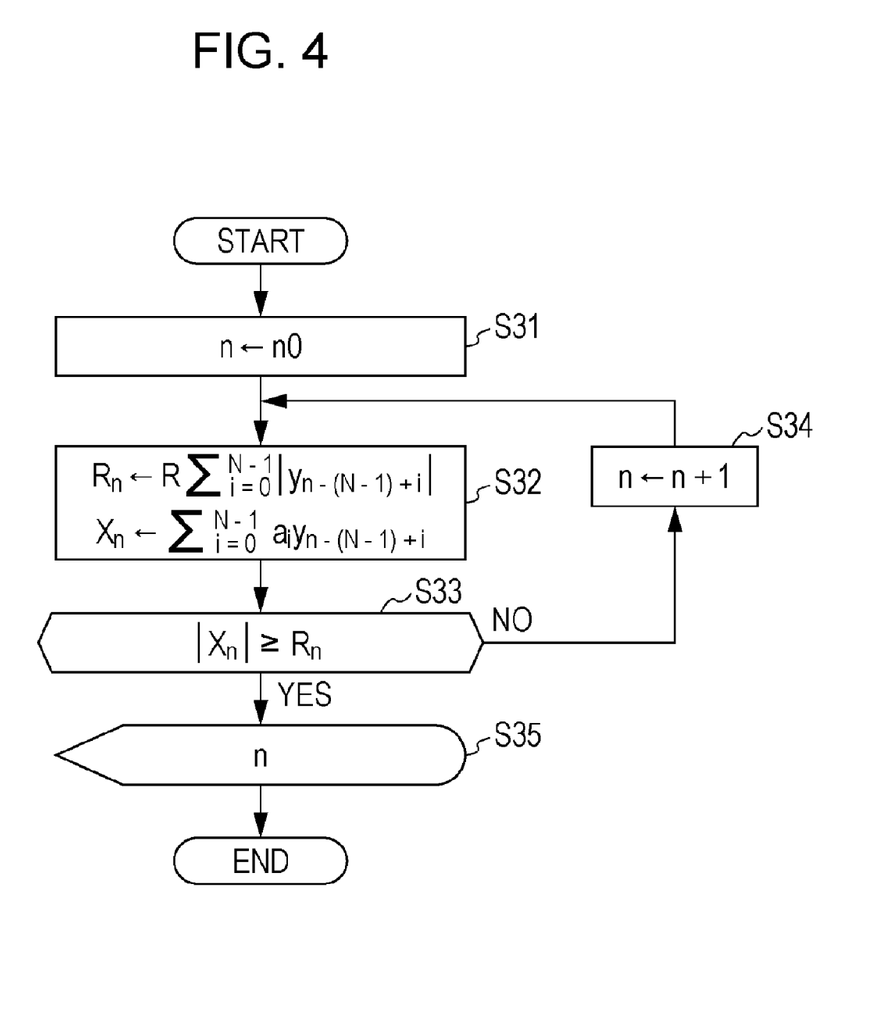
FIG. 4 is a flowchart illustrating a processing order (modified example) for detecting synchronous words by mutual correlation.

FIG. 4 shows a processing order in the modified example in the form of a flowchart.

First, a detection start time n of the synchronous word is designated as an initial value $n_o$ (step S31).

Then, according to Equation (4) as described above, the denormalization mutual correlation operation of the soft decision value series of the received samples corresponding to the amount of the past N words from the time n and the synchronous word series having the length of N words is performed. Also, according to Equation (3) as described above, the total sum of amplitude absolute values of the received sample series (i.e. received soft decision values) corresponding to the amount of the past N words from the time n is acquired, and the threshold value $R_n$ at the detection time n is calculated by multiplying the total sum by the threshold value coefficient R (where, 0≦R≦1) (step S32).

Then, it is determined whether the calculated denormalization mutual correlation value becomes larger than or equal to the threshold value $R_n$ (step S33).

Here, if the mutual correlation value has not yet reached the threshold value $R_n$ ("No" in step S33), it is determined that no synchronous word exists in the neighborhood of the received sample at time n. In this case, the synchronous word detection start time n is incremented, and then the processing returns to step S32 (step S34) to continue the denormalization mutual correlation operation.

On the other hand, if the denormalization mutual correlation value exceeds the threshold value $R_n$ ("Yes" in step S33), the corresponding time n is output as the synchronous word detection position (step S35), and the processing routine is ended.

Also, in the embodiments as illustrated in FIGS. 2 and 3, in at least either of the first step and the second step, the denormalization mutual correlation operation is performed to reduce the amount of operation or the circuit scale. However, if it is not necessary to consider the amount of operation or the circuit scale, even in the modified example in which the normalization mutual correlation operation is performed in either of the first step and the second step, the synchronous word detection within the search window can be performed more accurately in the second step after the search window is determined in the first step.

Figure 5:
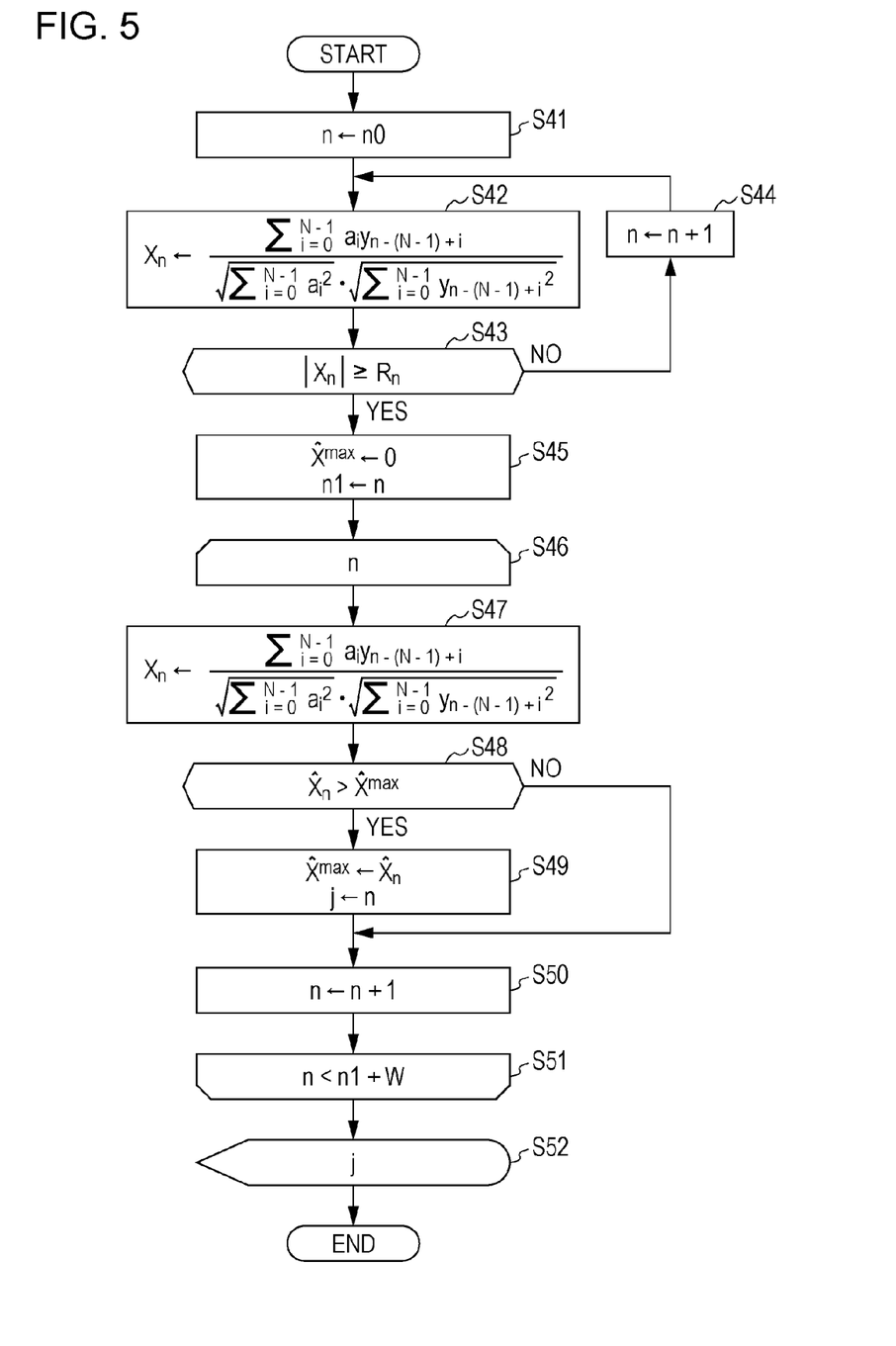
FIG. 5 is a flowchart illustrating a processing order (modified example) for detecting synchronous words by mutual correlation.

FIG. 5 shows a processing order in the modified example in the form of a flowchart.

First, a detection start time n of the synchronous word is designated as an initial value $n_o$ (step S41). Then, as the first step of detecting the synchronous word, the denormalization mutual correlation value is calculated from the received soft decision value, and the synchronous word detection start time is determined on the basis of the size comparison of the calculated value with the threshold value.

In the first step, specifically, according to Equation (2) as described above, the normalization mutual correlation operation of the hard decision value series of the received samples corresponding to the amount of the past N words from the time n and the synchronous word series having the length of N words is performed (step S42). At this time, using Equation (3) as described above or other equations, the threshold value $R_n$ at the detection time n may be calculated.

Then, it is determined whether the calculated denormalization mutual correlation value becomes larger than or equal to the threshold value $R_n$ (step S43).

Here, if the mutual correlation value has not yet reached the threshold value $R_n$ ("No" in step S43), it is determined that no synchronous word exists in the neighborhood of the received sample at time n. In this case, the synchronous word detection start time n is incremented, and then the processing returns to step S42 (step S44) to continue the normalization mutual correlation operation.

On the other hand, if the normalization mutual correlation value exceeds the threshold value $R_n$ ("Yes" in step S43), it is determined that the time in which the synchronous word comes is near. In this case, as the following second step, the detection process of the synchronous word detection position starts from the synchronous word detection start time.

In the second step, first, the maximum value of the normalization mutual correlation value that is calculated from the received hard decision value is set to the initial value of "0", and the synchronous word detection start time n determined in the first step is set as the initial value of the synchronous word detection position n1 (step S45).

Then, in a loop process composed of steps S46 to S51, the synchronous word detection position in which the mutual correlation value of the received hard decision value in the search window and the synchronous reference word becomes peak is searched for. Specifically, according to Equation (2) as described above, the normalization mutual correlation operation of the received hard decision values corresponding to the amount of the past N words from the time n and the synchronous word series $\{a_i\}$ having the length of N words is performed (step S47), and the calculated normalization mutual correlation value is compared in size with the maximum value up to now (step S48). If the calculated value exceeds the maximum value, the maximum value is appropriately updated, and the detection time n is preserved in a variable j as a candidate of the synchronous word detection position (step S49). The normalization mutual correlation operation and the update process of the maximum value and the synchronous word detection position are repeatedly performed as many as the number of times that corresponds to the search window W in consideration of the time n1 as the detection start time (steps S50 and S51).

Then, if the loop process is ended, the synchronous word detection time j when the maximum value of the mutual correlation value is detected is output as the synchronous word detection position (step S52), and the corresponding processing routine is ended.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A data processing apparatus comprising:
    a first correlation operation unit which performs a mutual correlation operation of a first input series and a second input series that are composed of discrete samples;
    a threshold value operation unit which calculates a threshold value based on the first input series;
    a first comparison unit which compares a first mutual correlation value calculated by the first correlation operation unit with the threshold value calculated by the threshold value operation unit;
    a search window setting unit which sets a search window for detecting the second input series to the first input series on the basis of the comparison result calculated by the first comparison unit;
    a hard decision unit which performs binarization of the first input series;
    a second correlation operation unit which performs a mutual correlation operation of a first input hard decision value calculated by binarization of the first input series and the second input series; and
    a detection position determining unit which searches for a maximum value of the mutual correlation value calculated by the second correlation operation unit within the search window, and determines the detection time of the maximum value as the detection position of the second input series.

2. The data processing apparatus according to claim 1, wherein the first correlation operation unit performs a denormalization mutual correlation operation of the first input series and the second input series composed of soft decision values of the discrete samples of the input signal.

3. The data processing apparatus according to claim 1, wherein the threshold value operation unit calculates the threshold value based on the total sum of amplitude absolute values of the first input series.

4. The data processing apparatus according to claim 1, wherein the second correlation operation unit performs denormalization mutual correlation of the first input hard decision value and the second input series.

5. The data processing apparatus according to claim 1, wherein the second input series is a reference word that is composed of elements of two known values.

6. A data processing method comprising:
    a first correlation operation step of performing mutual correlation operation of a first input series and a second input series that are composed of discrete samples;
    a threshold value operation step of calculating a threshold value based on the first input series;
    a first comparison step of comparing a first mutual correlation value calculated in the first correlation operation step with the threshold value calculated in the threshold value operation step;
    a search window setting step of setting a search window for detecting the second input series to the first input series on the basis of the comparison result calculated in the first comparison step;
    a hard decision step of performing binarization of the first input series;
    a second correlation operation step of performing mutual correlation operation of a first input hard decision value calculated by binarization of the first input series and the second input series; and
    a detection position determining step of searching for a maximum value of the mutual correlation value calculated in the second correlation operation step within the search window, and determining the detection time of the maximum value as the detection position of the second input series.

7. A receiving apparatus comprising:
    a receiving unit which receives transmitted data;
    an AD conversion unit which quantizes a received analog signal by sampling the analog signal;
    a first correlation operation unit which performs a mutual correlation operation of a received series composed of discrete samples after the AD conversion and a synchronous word composed of a known series;
    a threshold value operation unit which calculates a threshold value based on the received series;
    a first comparison unit which compares a first mutual correlation value calculated by the first correlation operation unit with the threshold value calculated by the threshold value operation unit;
    a search window setting unit which sets a search window for detecting the second input series to the first input series on the basis of the comparison result calculated by the first comparison unit;
    a hard decision unit which performs binarization of the received series;
    a second correlation operation unit which performs a mutual correlation operation of a first received hard decision value calculated by binarization of the received series and the synchronous word; and a detection position determining unit which searches for a maximum value of the mutual correlation value calculated by the second correlation operation unit within the search window, and determines the detection time of the maximum value as the detection position of the synchronous word.

8. A receiving method comprising:

a receiving step of receiving transmitted data;

an AD conversion step of quantizing a received analog signal by sampling the analog signal;

a first correlation operation step of performing mutual correlation operation of a received series composed of discrete samples after the AD conversion and a synchronous word composed of a known series;

a threshold value operation step of calculating a threshold value based on the received series;

a first comparison step of comparing a first mutual correlation value calculated in the first correlation operation step with the threshold value calculated in the threshold value operation step;

a search window setting step of setting a search window for detecting the second input series to the first input series on the basis of the comparison result calculated in the first comparison step;

a hard decision step of performing binarization of the received series;

a second correlation operation step of performing mutual correlation operation of a first received hard decision value calculated by binarization of the received series and the synchronous word; and a detection position determining step of searching for a maximum value of the mutual correlation value calculated in the second correlation operation step within the search window, and determining the detection time of the maximum value as the detection position of the synchronous word.

9. A synchronous detection apparatus comprising:

a first correlation operation unit which performs a mutual correlation operation of a received series composed of discrete samples and a synchronous word composed of a known series;

a threshold value operation unit which calculates a threshold value based on the received series;

a first comparison unit which compares a first mutual correlation value calculated by the first correlation operation unit with the threshold value calculated by the threshold value operation unit;

a search window setting unit which sets a search window for detecting the synchronous words to the received series on the basis of the comparison result calculated by the first comparison unit;

a hard decision unit which performs binarization of the received series;

a second correlation operation unit which performs a mutual correlation operation of a first received hard decision value calculated by binarization of the received series and the synchronous word; and a detection position determining unit which searches for a maximum value of the mutual correlation value calculated by the second correlation operation unit within the search window, and determines the detection time of the maximum value as the detection position of the synchronous word.

10. A synchronous detection method comprising:

a first correlation operation step of performing mutual correlation operation of a received series composed of discrete samples and a synchronous word composed of a known series;

a threshold value operation step of calculating a threshold value based on the received series;

a first comparison step of comparing a first mutual correlation value calculated in the first correlation operation step with the threshold value calculated in the threshold value operation step;

a search window setting step of setting a search window for detecting the synchronous words to the received series on the basis of the comparison result calculated in the first comparison step;

a hard decision step of performing binarization of the received series;

a second correlation operation step of performing mutual correlation operation of a first received hard decision value calculated by binarization of the received series and the synchronous word; and a detection position determining step of searching for a maximum value of the mutual correlation value calculated in the second correlation operation step within the search window, and determining the detection time of the maximum value as the detection position of the synchronous word.

11. A non-transitory computer readable storage medium storing a computer program for performing detection of a correlation position of two data series, the computer program causing a computer to:

perform a first mutual correlation operation of a first input series and a second input series that are composed of discrete samples;

calculate a threshold value based on the first input series;

compare a first mutual correlation value calculated by the first correlation operation with the threshold value;

set a search window for detecting the second input series to the first input series on the basis of the comparison between the first mutual correlation value and the threshold value;

perform binarization of the first input series;

perform a second mutual correlation operation of a first input hard decision value calculated by binarization of the first input series and the second input series; and search for a maximum value of a second mutual correlation value calculated by the second correlation operation within the search window, and determine the detection time of the maximum value as the detection position of the second input series.

* * * * *